(12) United States Patent
King (10) Patent No.: US 7,490,263 B2
(45) Date of Patent: Feb. 10, 2009

(54) APPARATUS, SYSTEM, AND METHOD FOR A STORAGE DEVICE'S ENFORCING WRITE RECOVERY OF ERRONEOUS DATA

(76) Inventor: Allen King, 5975 Colorview Ct., San Jose, CA (US) 95120

( * ) Notice: Subject to any disclaimer, the term of this patent is extended or adjusted under 35 U.S.C. 154(b) by 311 days.

(21) Appl. No.: 11/523,844

(22) Filed: Sep. 20, 2006

(65) Prior Publication Data

US 2007/0174682 A1 Jul. 26, 2007

Related U.S. Application Data

(63) Continuation-in-part of application No. 11/333,763, filed on Jan. 17, 2006.

(51) Int. Cl.
*G06F 11/00* (2006.01)
(52) U.S. Cl. ......................................................... 714/8
(58) Field of Classification Search ........................ 714/8
See application file for complete search history.

(56) References Cited

U.S. PATENT DOCUMENTS

| | | | | |
|---|---|---|---|---|
| 5,235,585 | A * | 8/1993 | Bish et al. | 369/53.17 |
| 5,278,838 | A | 1/1994 | Ng et al. | |
| 5,313,626 | A | 5/1994 | Jones et al. | |
| 5,598,549 | A | 1/1997 | Rathunde | |
| 5,615,190 | A | 3/1997 | Best et al. | |
| 5,721,816 | A | 2/1998 | Kusbel et al. | |
| 5,768,494 | A * | 6/1998 | Takeishi | 714/17 |
| 5,774,643 | A | 6/1998 | Lubbers et al. | |
| 5,872,800 | A * | 2/1999 | Glover et al. | 714/766 |
| 5,913,927 | A | 6/1999 | Nagaraj et al. | |
| 5,918,001 | A | 6/1999 | Ueno et al. | |
| 5,941,998 | A | 8/1999 | Tillson | |
| 5,948,110 | A | 9/1999 | Hitz et al. | |
| 5,961,652 | A | 10/1999 | Thompson | |
| 5,974,544 | A | 10/1999 | Jeffries et al. | |
| 6,014,755 | A | 1/2000 | Wells et al. | |
| 6,018,778 | A | 1/2000 | Stolowitz | |
| 6,052,797 | A | 4/2000 | Ofek et al. | |
| 6,327,106 | B1 | 12/2001 | Rothberg | |
| 6,384,999 | B1 | 5/2002 | Schibilla | |
| 6,470,461 | B1 * | 10/2002 | Pinvidic et al. | 714/8 |
| 6,513,135 | B2 * | 1/2003 | Harada | 714/42 |
| 6,539,496 | B1 | 3/2003 | Peters et al. | |
| 6,854,071 | B2 | 2/2005 | King et al. | |
| 6,918,054 | B2 * | 7/2005 | Hirata et al. | 714/17 |
| 6,993,679 | B2 * | 1/2006 | George | 714/8 |
| 7,120,737 | B1 * | 10/2006 | Thelin | 711/112 |
| 7,174,478 | B2 * | 2/2007 | Asano | 714/8 |
| 7,275,179 | B1 * | 9/2007 | Coatney | 714/7 |
| 7,281,160 | B2 * | 10/2007 | Stewart | 714/8 |
| 7,296,142 | B2 * | 11/2007 | Lim et al. | 713/1 |
| 2002/0169996 | A1 * | 11/2002 | King et al. | 714/8 |

* cited by examiner

*Primary Examiner*—Robert Beausoliel
*Assistant Examiner*—Elmira Mehrmanesh (57) ABSTRACT

An apparatus, system, and method are disclosed for a storage device's enforcing write recovery of erroneous data. The storage device enforces write recovery leading to a reassignment and re-write for the defective data block by the storage controller at a subsequent write opportunity with a usual write without verify command. The invention enables the storage device to identify, and re-discover the defect by automatically verifying the data written, and report an unrecovered write error to the storage controller on said write command, causing said write recovery to occur.

22 Claims, 6 Drawing Sheets

| Time Period | Seq No. | Command Name | From LBA | No. of Blocks | Auto Verify | Status | Error Posted in Sense | Defective LBA |
|---|---|---|---|---|---|---|---|---|
| t1 | 0 | WRITE | L | 4 | No | GOOD | --- | --- |
| t2 (Case1) | 0 | READ | L | 4 | No | GOOD | --- | --- |
| t2 (Case 2) | 0 | READ | L | 4 | No | CHECK COND. | Medium Error | L+1 |
| t3 | 0 | WRITE | L | 2 | Yes | CHECK COND. | Unrecovered Write Error | L+1 |
| t3 | 1 | WRITE | L+1 | 1 | Yes | CHECK COND. | Unrecovered Write Error | L+1 |
| t3 | 2 | WRITE | L+1 | 1 | Yes | CHECK COND. | Unrecovered Write Error | L+1 |
| t3 | 3 | REASSIGN BLOCKS | L+1 | 1 | No | GOOD | --- | --- |
| t3 | 4 | WRITE | L+1 | 1 | No | GOOD | --- | --- |
| t3 | 5 | READ | L+1 | 1 | No | GOOD | --- | --- |

FIG. 6

APPARATUS, SYSTEM, AND METHOD FOR A STORAGE DEVICE'S ENFORCING WRITE RECOVERY OF ERRONEOUS DATA

RELATED APPLICATIONS

This application is a continuation-in-part of U.S. patent application Ser. No. 11/333,763, filed Jan. 17, 2006, which is incorporated herein in its entirety.

BACKGROUND OF THE INVENTION

1. Field of the Invention

This invention relates to data recovery in a storage device and more particularly relates to write recovery of erroneous data in the storage device.

2. Description of the Related Art

A modern computer utilizes a storage system consisting of a storage controller and at least one attached storage device. Typically, the storage device is a hard disk drive ("HDD"), floppy disk, optical disk, tape drive, micromechanical device, solid state disk, or the like. The storage controller can be a simple host bus adapter, or a sophisticated redundant array of independent disks ("RAID") controller, managing the operation of non-redundant RAID and/or redundant RAID storage devices. The computer may be a personal computer ("PC"), a server or client computer, a network computer, and/or another type of general/special-purpose computer.

Regardless of the type of computer or the type of storage controller to which a storage device such as HDD is attached, the HDD performs the basic function of reading data and writing data for the computer via a READ and WRITE command, respectively, from the storage controller. Without the explicit knowledge of the availability of upstream hardware and software capabilities and the type of applications the data is used in, the HDD invariably strives to attain independently the highest degree of user data protection possible. Specifically, the HDD may employ a near-worst case approach to protecting data. This near-worst case approach is justifiable because, besides a redundant RAID storage system wherein unreadable data from one member HDD can be regenerated from other member HDDs of the array, a vast number of computers, especially PCs, each employ a single HDD, a non-redundant RAID array or some other drive configuration without redundancy for cost/performance or other reasons. It is well known that failure to deliver data reliably by the HDD when requested may have extremely serious consequences for a variety of computer applications, such as financial calculations, manufacturing processes, and health and environmental controls, to name a few.

When a READ or WRITE command is completed with no error, the HDD, conforming to Small Computer System Interface ("SCSI") standards, for example, returns a GOOD status. For performance reasons, data is typically written on the HDD without an immediate readback to verify that the data is correctly written. Unless a failure occurs during the write operation, the write is considered successful, with a GOOD status returned from the HDD. Unfortunately, as well known to those skilled in the art, even though no write error was encountered at a certain data block location on the HDD, it is common for a subsequent read operation at the data block to be unsuccessful. As HDDs increase recording density, pushing the technology to its limits with tracks and sectors spacing ever closer and more data on the HDDs being accessed, higher spindle spin rates, and weaker signals to avoid interference, the probability of read error occurrences increases dramatically.

HDDs generally utilize a number of advanced techniques to manage errors while reading data from the media. The basis of read error detection and correction in an HDD is the inclusion of a powerful error correction code ("ECC") consisting of a number of bits appended to the end of a fixed-length block of data in each disk sector. Errors corrected by the ECC on-the-fly are not considered real read errors. When a data block encounters an error that fails to be readily corrected by the ECC, the HDD enters into an automatic retry.

Basically, there are two types of read errors: recovered and unrecovered. Recovered read errors are errors that require re-reads to retrieve the data without error. Depending upon the nature of the error detected and the manufacturer's preference, one or more methods are available to invoke during read retries, such as reloading read channel registers to calibrated values, using various off-track offsets and retrying the read, using a fixed gain while retrying, margining the error tolerance of sync mark detection, applying an advanced software ECC algorithm, and switching the bias current of a certain head between retries. Some of the methods are time-consuming and complex. The erroneous data may be recovered after applying those techniques. Unrecovered read errors are those that are not correctable using the ECC or retries within the retry limits specified by the using computer even after sophisticated correction methods are applied.

Recurring data error activity at the same physical location is an indication of a problem. The problem can be due to magnetic damage or a media defect. Magnetic damage is a defect in the bit pattern written to the media. A media defect such as a pit, scratch, or thin spot is physical damage to the recording capability of the media. Recovery action to correct these types of defects differs. In both cases, however, the error can be corrected without replacing the HDD unit. For magnetic defects, a rewrite at the failing location address may be all that is required. For media defects, the data block written in the defective physical sector is reallocated to a spare sector, usually defect-free. HDDs determine the need to either rewrite or reallocate during a read error recovery.

All HDDs have spare sectors located across the drive. Defective data blocks such as those containing marginally recovered read errors found during normal use of the HDD can be reallocated by the HDD automatically during a read operation if allowed by the computer. Prior to the reallocation, the HDD may, for example, first verify that the original sector location is defective with multiple tests involving writes and verifies using the recovered data. If those tests fail, the HDD then reallocates the recovered data to a new location using one of available spare sectors and stores the recovered data therein. If the automatic reallocation during a read is not allowed, the HDD recommends that the storage controller initiate the reallocation. For unrecovered read errors, the HDD generally recommends that the storage controller reallocate the defective blocks, since the HDD does not have valid replacement data for those defective blocks.

The logical block address ("LBA") addressing scheme used for specifying locations of data blocks stored on the HDD is also used for reallocating data blocks. The LBA addressing scheme describes the disk as a linear, consecutively-numbered set of logical data blocks. Each of those consecutive numbers is known as the LBA of the data block. The HDD maps a requested LBA to a particular cylinder-head-sector ("CHS") address for accessing the data block on the media in response to a READ or WRITE command. For reallocated defective blocks, the HDD maintains a list of each of their LBAs and its reassigned CHS address. The operation of reallocating a defective block to a spare block is also commonly referred to as block reassignment or simply reassignment. The selection of an available spare sector for reallocation is made by the HDD regardless of whether the reassignment is initiated by the HDD or the storage controller.

The storage controller may be configured to initiate reassignment operations. When recovered errors are reported during a read, some storage controllers take proper recovery action in accordance with the sense data received, such as performing a reassignment as recommended. Details of appropriate error recovery procedures will be discussed later. Unfortunately, implementation of other storage controllers for response to the sense data recommending a reassignment varies from one manufacturer to another. For recovered read errors, certain storage controllers may not perform reassignments as their developers figure that the data transferred to the read buffer by the HDD in each case is already good. Furthermore, in some cases in which the HDD is not allowed by the computer to report recovered errors, the storage controller will certainly not reassign any marginally recovered data blocks as the HDD would have explicitly recommended had reporting of recovered errors been allowed.

Normally, when a data block needs to be updated, a WRITE command is issued by the storage controller, without prior knowledge or retained memory that the block on the HDD may have been determined by the HDD as defective (marginally recoverable or unrecoverable, but not yet reassigned for any of the aforesaid reasons). Merely rewriting a previously found erroneous block may not resolve the problem, especially when a reassignment for that block is already recommended by the HDD. On a write request by the host computer, the storage controller will usually issue a WRITE command to the HDD. Unless a write error occurs, the storage controller will not normally verify the data written or perform a block reassignment. As a result, the data may remain erroneous at the same defective physical location on the HDD. Therefore, in some cases, data at a defective location may never be recovered even when updated data or replacement data becomes available for a write or relocation.

From the foregoing discussion, it should be apparent that a need exists for an apparatus, system, and method that allow the HDD to enforce a write recovery procedure to be performed by the storage controller, including a reassignment to a spare sector recommended for a defective data block. Beneficially, such an apparatus, system, and method would increase computer system performance by avoiding futile re-read attempts.

SUMMARY OF THE INVENTION

The present invention has been developed in response to the present state of the art, and in particular, in response to the problems and needs in the art that have not yet been fully solved by currently available storage system. Accordingly, for a storage device's enforcing write recovery of erroneous data by a storage controller, the present invention has been developed to provide an apparatus, system, and method that overcome many or all of the above-discussed shortcomings in the art.

The apparatus for the storage device to enforce such write recovery is provided with a logic unit containing a plurality of modules configured to functionally execute the steps of the enforcement. These modules in the described embodiments include a reassignable check module, an auto verify module, and an error posting module.

In one embodiment, the reassignable check module, is configured to determine whether the logical block address ("LBA") of a data block specified by a write without verify command is included in the storage device's reassignment log. The reassignment log stores a list of LBAs of the defective blocks encountered during prior read operations while the storage device was unable to reassign any of them to a spare block on the media and recommends a reassignment for it by the storage controller.

If the LBA is found listed in the reassignment log, then subsequent to the write operation specified by said write command, in one embodiment, the auto verify module automatically verifies that the data is correctly written. In response to finding the data incorrectly written by the auto verify module, the error posting module reports to the storage controller that an Unrecovered Write Error occurred at the LBA during the write operation, which may trigger the initiation of a storage controller write recovery procedure involving write retries. The auto verify module may verify data by means of the ECC appended to the data.

Typically, if the error is determined to be persistent during storage controller write retries in which the auto verify modules retires the auto verify operation on data written each time, the storage controller may perform a reassignment for the defective block and a re-write of the data at the reassigned block location. The reassignment will cause the LBA of the defective block to be removed from the reassignment log. Following a reassignment, the auto verify module may stop performing auto verify operations on the LBA reassigned. In certain embodiments, the auto verify function may be enabled and disabled at the storage device user's option.

A system of the present invention is also presented to allow the storage device to enforce write recovery of erroneous data by the storage controller. The system in the disclosed embodiments includes a host computer, a storage controller, and a storage device comprising an interface module, a head disk assembly, a processor, a memory, a positioning control module, a read-write data handler module, a reassignable check module, an auto verify module, and an error posting module.

The storage device conventionally provides a data storage medium and conducts data transfer operation from or to the medium at a specified location upon a READ or WRITE command issued by the storage controller in response to a read or write request from the host computer. In addition, the storage device detects and attempts to recover from read/write data errors occurring during the read/write operation to the maximum allowable extent. Beyond that, the storage device may notify the storage controller of a recommended recovery action such as a reassignment for a defective block encountered.

In disclosed embodiments, the storage device provides a reassignment log listing LBAs of the defective blocks needing reassignments by the storage controller and removing an LBA when a reassignment for the corresponding defective block is reassigned. The reassignable check module checks the reassignment log for an inclusion of the LBA specified by a write without verify command. If included, then the auto verify module is activated following a successful completion of the write operation to automatically verify that the data is correctly written at the LBA for the command. In response to the finding of data not correctly written, the error posting module will report an Unrecovered Write Error to the storage controller, which may cause the storage controller to make a reassignment for the LBA failing an auto verify persistently following write retries and to re-write the data at the reassigned location.

A method of the present invention is also presented for the storage device's enforcing write recovery of erroneous data. The method in the disclosed embodiments substantially includes the steps to carry out the functions presented above with respect to the operation of the described apparatus and system. The method includes determining reassignability of the LBA specified by a write without verify command, auto verifying that data is correctly written at the reassignable LBA, reporting to the storage controller an Unrecovered Write Error at the LBA in response to failure of the auto verify, and reassigning and re-writing data for the failed LBA during the storage controller's write recovery activated in response to the write error report.

The reassignable check module determines the reassignability of the LBA specified by said write command by searching the storage device's reassignment log for the LBA. If the search is successful, the auto verify module automatically verifies data written for the command. If the auto verify fails, the error posting module is invoked to report an Unrecovered Write Error at the LBA to the storage controller. The storage controller typically affirms the error first and then makes a reassignment of the defective block, and subsequently re-writes the data at the reassigned location on the storage device. In one embodiment, if the data written is verified to be correct, the storage device removes the LBA from the reassignment log.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The present invention employs a search capability to determine that a data block to be written has already been designated as reassignable. In conjunction with a successful search, the present invention provides means for enforcing write recovery resulting in a relocation of the reconfirmed defective block. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
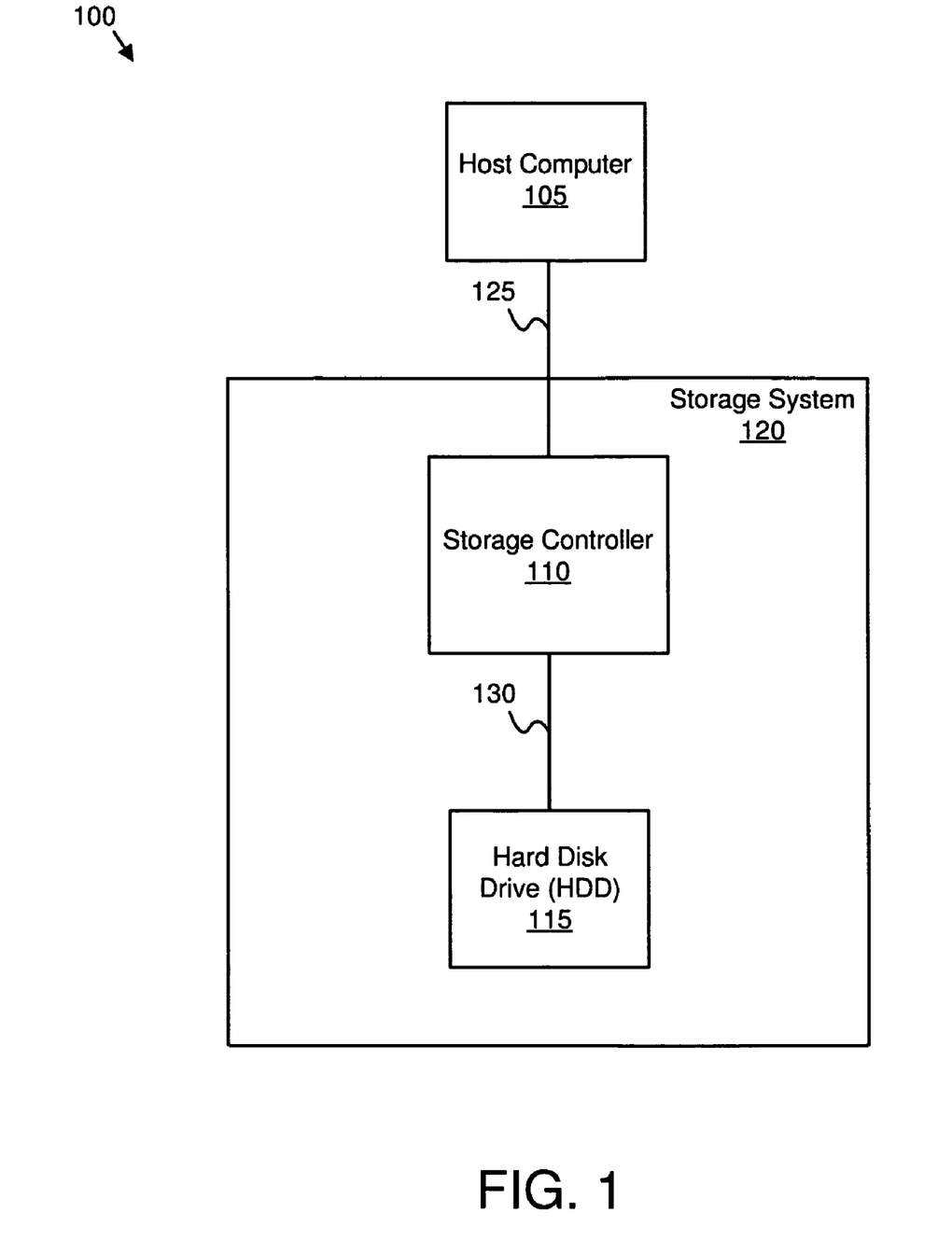
FIG. 1 is a schematic block diagram illustrating one embodiment of a system for a storage device's data storage/retrieval and enforcing write recovery in accordance with the present invention.

FIG. 1 is a schematic block diagram illustrating one embodiment of a system 100 for a storage device's data storage/retrieval and enforcing write recovery in accordance with the present invention. The system 100 may accommodate one or more hard disk drives ("HDDs") 115 for data transfer between a host computer 105 and HDDs 115 through the storage controller 110. A host interface 125 may be any one of available standardized buses such as Peripheral Component Interconnect ("PCI") bus, and Industry Standard Architecture ("ISA") bus for connecting to the host computer 105, a personal computer, for example. The storage controller 110 may be a host bus adapter ("HBA") or an intelligent controller such as RAID controller. The HDD 115 is attached to the storage controller 110 through a device interface 130. The device interface 130 may be one of a number of industry standard interface types, including Small Computer System Interface ("SCSI") Parallel Interface ("SPI"), Serial Attached SCSI ("SAS"), Fibre Channel ("FC"), Fibre Channel-Arbitrated Loop ("FC_AL"), Advanced Technology ("AT") Attachment ("ATA"), Serial ATA ("SATA"), Universal Serial Bus ("USB"), IEEE 1394, and their variants and enhancements.

Regardless of the implementation methods used, SCSI-based, for example, storage controllers 110 have the ability to execute a set of SCSI commands for typical disk drive functions on HDDs 115 supporting SCSI commands. For basic operations, SCSI commands issued to the HDD 115 by the storage controller 110 generally include INQUIRY, TEST UNIT READY, START/STOP UNIT, READ CAPACITY, READ, WRITE, REQUEST SENSE, REASSIGN BLOCKS, MODE SELECT, and MODE SENSE. For data transfer, READ and WRITE commands specify the beginning LBA and a number of consecutive data blocks to be read from and written to the HDD 115, respectively. In a certain embodiment, the HDD 115 may automatically transfer sense data to the storage controllers 110 after detecting an error during command execution, without requiring the use of a REQUEST SENSE command. The ATA/SATA-based storage controller 110 can perform similar functions on an ATA/SATA HDD 115 using the ATA/SATA command set, which has comparable commands, with some differences from those of the SCSI such as IDENTIFY DEVICE (instead of INQUIRY), no explicit REQUEST SENSE, and REASSIGN BLOCKS not yet adopted. Henceforth, only SCSI commands will be mentioned in this document although analogous operations may be performed with other command sets including the ATA/SATA command set.

A command is executed by sending a command descriptor block ("CDB") to the HDD 115, which contains those specified parameters plus others. A command is completed when the storage controller 110 receives a status byte from the HDD 115. For a successful completion, the status code is "00" in hex, indicating a GOOD status. If an error is detected during the execution of the command, the status code of "02" in hex is returned, indicating a CHECK CONDITION status, following which the storage controller 110 usually issues a REQUEST SENSE command to retrieve the HDD's 115 sense data describing the error detected.

During the execution of READ and WRITE commands, the storage controller 110, generally performs recovery procedures for two classes of errors: non-data errors and data errors, as expected by the HDD 115. Non-data errors are those errors that do not have a direct relationship with transferring data to and from the media. The storage controller 110 options for non-data error handling are limited to logging the error, retrying the failing command, or replacing the drive.

Data errors are those errors that deal with the handling of data to and from the media. They are identified by the Sense Key with the code "1" (hex) meaning Recovered Error, or "3" (hex) meaning Medium Error (unrecovered error), and by the Additional Sense Code ("ASC") contained in the sense data. Some ASC codes in hex for read data errors are listed and described in Table 1 below. Each of these codes when accompanied with an appropriate Additional Sense Code Qualifier ("ASCQ") such as shown in Table 1 indicates an HDD's 115 recommendation for reassignment for a particular defective block designated in sense data from the HDD 115. The ASC code in hex for a write error is "0C".

TABLE 1

Recommend-Reassign Read Errors (using HDD sense data combinations)

| Sense Key | ASC | ASCQ | Description |
|---|---|---|---|
| 1 | 16 | 04 | Recovered sync byte error--recommend reassign |
| 1 | 17 | 07 | Recovered data without ECC--recommend reassign |
| 1 | 18 | 05 | Recovered data with ECC--recommend reassign |
| 3 | 11 | 0B | Unrecovered read error--recommend reassign |
| 3 | 14 | 05 | Record not found--recommend reassign |
| 3 | 16 | 04 | Unrecovered sync byte error--recommend reassign |

As discussed previously, for recovered read errors, implementation of the recovery procedure differs from one storage controller 110 manufacturer to another. In some cases, recovery actions on a failing READ command as recommended by the HDD 115 through the returned sense data may or may not be properly taken by the storage controller 110. For unrecovered read error, without the availability of replacement data, the storage controller 110 can not perform a data recovery during the read operation to transfer valid data to the host computer 105 requesting data, except for a redundant RAID array. In the latter case, if the HDD 115 is a member disk of the array managed by the storage controller 110, the storage controller 110 regenerates the unread data from other members of the array and returns it to the host computer 105. However, the storage controller 110 may or may not exercise its option of performing a write recovery procedure involving a reassignment and re-write of the reassigned block with the regenerated data.

If the storage controller 110 does not or can not perform a write recovery procedure which may involve a block reassignment as recommended by the HDD 115 on a READ command, the storage controller 110 typically will not remember that a read error occurred in the data block at the next write opportunity. Therefore, the storage controller 110 will cause a subsequent WRITE command to be executed as usual, as if no read error had occurred in the block to be updated, for example.

In certain embodiments, the storage controller 110 may also support a write-recovery related command recommended by the HDD 115 known as WRITE AND VERIFY command. The WRITE AND VERIFY command requests that the HDD 115 write the data transferred from the storage controller 110 and then verify that the data is correctly written. Normally, for the verify portion of the command, the HDD 115 performs an ECC check on the specified number of blocks after the write completes successfully.

If an ECC check (error) is detected on all re-reads for the purposes of data verification and the data was not corrected (either because it was uncorrectable or the correction was not attempted), a CHECK CONDITION status is returned, and the Sense Key will indicate a Medium Error. The WRITE AND VERIFY command may specify a "Byte Check", instead of the ECC check, which causes the HDD 115 to do a byte-to-byte compare of data after it is written to the HDD 115. A miscompare error is an indication that the drive cannot reliably write or read the media. The drive may then be subjected to a service action. In an alternate embodiment, the storage controller 110, especially when functioning as RAID controller, uses a READ command with the Force Unit Access ("FUA") flag bit being set to 1 following a WRITE command to verify that data is correctly written on the media.

During a write operation, the storage controller 110 typically starts a write recovery procedure following the occurrence of a write error, especially an unrecovered write error, identified by Sense Key of "3", ASC of "0C", and ASCQ of "00" or "03", all in hex. The sense data combination represents an Unrecovered Write Error or Unrecovered Write Error—Recommending Reassignment, respectively. A typical storage controller 110 write recovery procedure for this error in a block includes retry writes within pre-defined limits, and, if the error persists, a REASSIGN BLOCKS command is issued, followed by a WRITE command and a READ command with the FUA bit being set to 1 for data verification in the block, or simply a WRITE AND VERIFY command if supported.

As is well known in the art, the HDD 115 uses rigid disks coated on both sides with a magnetic material designed to store digital information. In certain embodiments, the storage media can be removed from the disk drive. Said information is recorded on each disk surface in concentric circles called tracks. Each track is divided into smaller segments called sectors, each of which holds a block of information, with a block size of 512 bytes, for example. A typical HDD 115 design includes a spindle upon which the disks spin at a constant, high speed, driven by a spindle motor. The disks are accessed for recording information onto them (write operation) or retrieving information from them (read operation), using read-write heads, usually with one head per disk surface. The read-write heads are mounted on a structure often referred to as the actuator assembly. The actuator arm moves the read/write head from track to track to allow it to access the entire surface of the disk. The disks, spindle, spindle motor, actuator, and read-write heads are all contained in a sealed chamber called the head disk assembly ("HDA"). Outside of the HDA typically is the logic board that controls activities of the internal parts and controls the movement of data into and out of the HDD 115.

The associated electronics of the HDD 115 control the movement of the actuator and the rotation of the disk, position the read-write head over the exact location of the data requested, and perform reads and writes upon the receipt of commands from the storage controller 110. The HDD 115 drive electronics are designed to schedule and prepare for reads and writes across the disk efficiently, and remap sectors of the disk that may fail. Like most modern storage devices, the HDD 115 supports an early warning system known as Self-Monitoring Analysis and Reporting Technology ("SMART"), by which disk failure conditions can be predicted, alerting the user to take actions to prevent data loss.

Since it is normal for a hard disk to encounter errors during reading, the HDD 115 also utilizes a sequence of techniques to manage errors that occur while reading data from the media. Although each manufacturer uses different techniques, in one embodiment, the HDD 115 uses a multi-level error management approach: 1. ECC error detection, for any read errors; 2. ECC correction, to automatically correct correctable errors, possibly on the fly (these are not considered real errors); 3. Automatic retry, for ECC uncorrectable errors up to a pre-defined number of times before quitting (an error corrected after a simple-minded retry is considered "recovered error"); 4. Advanced error correction, on subsequent retries using more advanced error correction methods for increased probability of success (these errors are marginally recovered errors); and 5. Failure Declaration, for the sectors still unreadable after multi-level retries (these errors are unrecovered errors).

Any errors that occur during a read, even if recovery is successful, are potentially causes for concern. The HDD 115 generally attempts recovery of those errors to the extent possible. Based on the SCSI standard, data error recovery actions are typically taken by the HDD 115 under user's control. Preferably, the recovery control information is contained in the read-write error recovery mode page according to the SCSI standard. This mode page is a block of control information transferred from the storage controller to the HDD 115 via a MODE SELECT command and stored in the HDD 115 by the user. This mode page specifies a number of user-settable parameters to control read-write error recovery actions that may be taken by the HDD 115, such as read retry count, write retry count, and eight recovery control flag bits. Generally, each flag bit may be set to one ("1") or zero ("0"), with 1 meaning enable and 0, disable. The flag bits most significant to the discussion here of data error recovery are automatic write reallocation enabled ("AWRE") bit, automatic read reallocation enabled ("ARRE") bit, post error ("PER") bit, and read continuous ("RC") bit. The HDD 115 usually notifies the storage controller 110 of each problem for error recovery action or logging.

As described before, for marginally recovered data, the HDD 115 attempts to relocate it to a spare sector if enabled by the ARRE parameter, when the ARRE flag bit is set to 1. If the ARRE flag bit is set to 0, then the HDD 115 sends proper sense data for a recovered read error such as listed in Table 1 to the storage controller 110, indicating a recommendation of reassignment for the defective block. For an unrecovered read error, the HDD 115 similarly identifies it to the storage controller 110 with appropriate sense data such as included in Table 1, recommending a defective block reassignment. Note that in one embodiment, if the AWRE flag bit specified in said mode page is set to 1, the HDD 115 performs an automatic reallocation for an unrecovered data block on a subsequent WRITE command specifying the corresponding LBA, based on an unrecovered block list stored by the HDD 115.

If the PER flag bit specified in the read-write error recovery mode page is set to 0 or the RC flag bit specified in said mode page is set to 1, causing the HDD 115 to omit the reporting of recovered errors, the HDD 115 will return a GOOD status at the conclusion of a READ command encountering a recovered error. Thus, any marginally recovered data needing a reassignment is not reported to the storage controller 110, which will of course do nothing to recover the error.

To resolve this problem, the HDD 115 can attempt to make the storage controller 110 aware of the existence of such defective block at the next write opportunity for the block provided that the HDD 115 remembers the LBA of the block. Fortunately, in certain embodiments, the HDD 115 maintains for statistics purposes a reassignment log that lists LBAs of the defective blocks that the HDD 115 recommends for reassignments by the storage controller 110 while the HDD 115 is unable to perform the needed reassignments. When a defective block is reassigned, its LBA is removed from the list.

Having located in the reassignment log such unreported defective block that is to be written on a new request, the HDD 115 can automatically perform a verify (referred to as auto verify) operation on the WRITE command to reconfirm the existence of the defect after the data is written. Since the site for the defective block has previously been determined defective during a read operation, the probability of finding it defective again during the verify operation is high. Note that in one embodiment, this kind of defect is also discoverable had a supported WRITE AND VERIFY command been issued instead of a WRITE command by the storage controller if the storage controller had a prior knowledge of the defect.

Using the auto verify function, the HDD 115 can also cause an error to recur on a WRITE command specifying a block that had an unrecovered read error or a reported marginally recovered read error that has not been resolved for some reasons, as the reassignment log in the HDD 115 lists all the defective blocks yet to be reassigned by the storage controller 110. For the recurred error, the HDD 115 can report an Unrecovered Write Error to the storage controller 110. Thus, the storage controller 110 will certainly start a write recovery procedure involving a reassignment and re-write of the defective block as described above. The system 100 provides facilities for the storage system 120 to effect proper write recovery of errors encountered during data transfer to/from the storage device.

Figure 2:
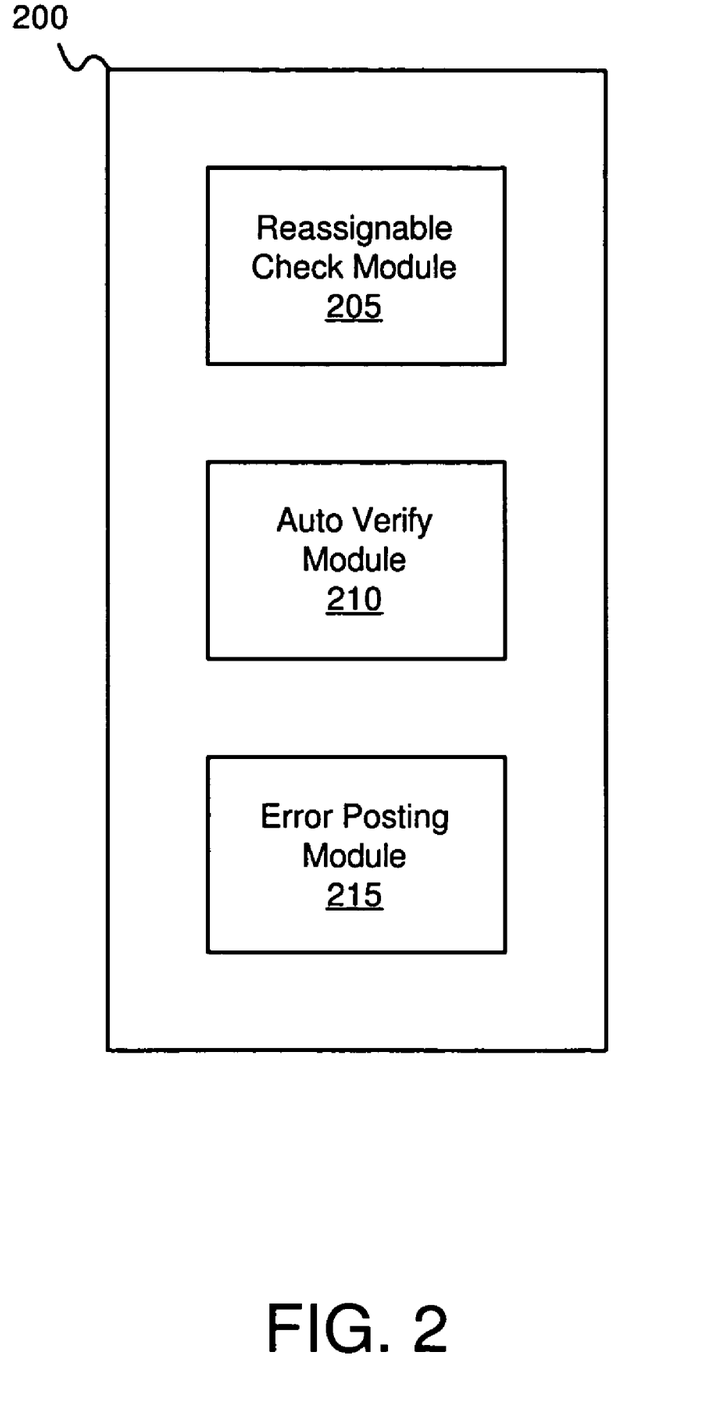
FIG. 2 is a schematic block diagram illustrating one embodiment of an apparatus for a storage device's enforcing write recovery in accordance with the present invention.

FIG. 2 is a schematic block diagram illustrating one embodiment of an apparatus 200 for a storage device's enforcing write recovery in accordance with the present invention. The enforcement apparatus 200 allows the storage device to enforce write recovery of erroneous data to prevent data loss. The HDD 115 of FIG. 1 may embody the apparatus 200. The description of the enforcement apparatus 200 refers to elements of FIG. 1, like numbers referring to like elements. The enforcement apparatus 200 may be located in the HDD 115 of FIG. 1. The enforcement apparatus 200 includes a reassignable check module 205, an auto verify module 210, and an error posting module 215.

Figure 5:
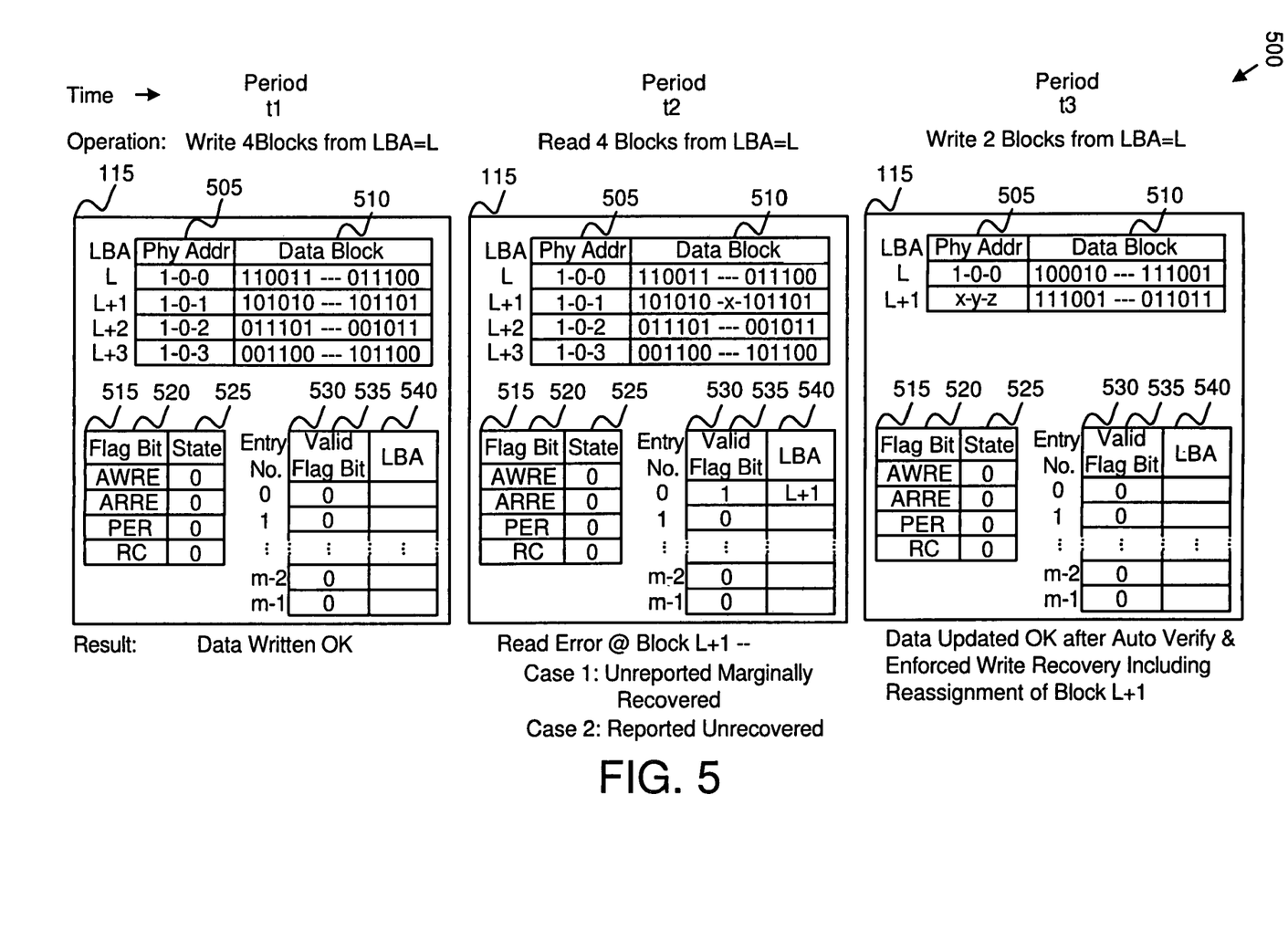
FIG. 5 is a schematic block diagram illustrating one embodiment of LBA information involved in a storage device enforced write recovery in accordance with the present invention.

As mentioned previously, in certain embodiments, the HDD 115 has a reassignment log that lists LBAs of all defective blocks already identified for the storage controller 110 to reassign because of the HDD's 115 automatic reassignment disability or unavailability of valid data, and the log removes a listed defective block LBA once it is reassigned. An illustrated exemplary reassignment log 530 is shown in FIG. 5. The reassignable check module 205 searches the reassignment log 530 for the inclusion of an LBA specified by a write without verify command such as WRITE command. If the search is successful, the reassignable check module 205 notifies the auto verify module 210 of automatically performing a verify on the data at the LBA after it is written on the WRITE command.

The auto verify module 210 then automatically verifies that data in the reassignable data block is correctly written for the WRITE command after the write is completed successfully. In one embodiment, the auto verify module 210 performs a verify like the verify portion of the WRITE AND VERIFY command, but with restrictions. As such, the auto verify module 210 verifies only the identified reassignable block by means of an ECC check, excluding a byte check option that checks for media reliability rather than media defect. Data recovery actions for the auto verify in this embodiment may be subject to the controls specified by the mode page for error recovery parameters for verify, such as verify retry count, verify correction span that specifies the size in bits of the largest data error burst for which data error correction may be attempted, and verify recovery time limit. One exception is that no soft (non-recurring) errors are reported at the conclusion of the auto verify.

In an alternate embodiment, the auto verify module 210 performs a verify like a READ command with the FUA bit being set to 1 following a WRITE command, except that no data is transferred to the storage controller 110 for all the internal reads during this operation. Data recovery actions for the auto verify in this embodiment may be controlled by the parameters specified in the read-write error recovery mode page. In any embodiment, the auto verify operation may be enabled or disabled at a storage device 115 user's option to be defined.

As mentioned in a previous discussion, the probability of finding the written data erroneous again by the auto verify operation at the site that was determined defective during a read is high. Thus, when the data is found not correctly written, the auto verify module 210 signals the error posting module 215 to post an Unrecovered Write Error. The error posting module 215 will then cause the HDD 115 to return a CHECK CONDITION status and Sense Key of 3h (Medium Error), ASC of 0Ch, and ASCQ of 00h or 03h for the defective block to the storage controller 110. The storage controller 110 consequently goes into write retry within pre-defined limits, and the auto verify module 210 performs an auto verify operation for each write retry. A persistent error will cause the storage controller 110 to proceed with the defective block reassignment, a re-write and an explicit verify of the data written at the reassigned location, as discussed before.

Once a block reassignment is made, the auto verify module 210 no longer performs a verify for the re-write operation. Subsequent to the reassignment, the HDD 115 will cause the reassignment log to be updated by removing the reassigned LBA from its list. Should the auto verify operation find the "formerly-defective" block non-defective, the auto verify module 210 may cause the reassignment log to remove the LBA of such block. As a result, the WRITE command is considered successful and no write recovery procedure will follow. The enforcement apparatus 200 causes the HDD 115 to enforce a write recovery procedure to be followed by the storage controller 110 when a defective block has been re-discovered at a new write opportunity for that block.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 3:
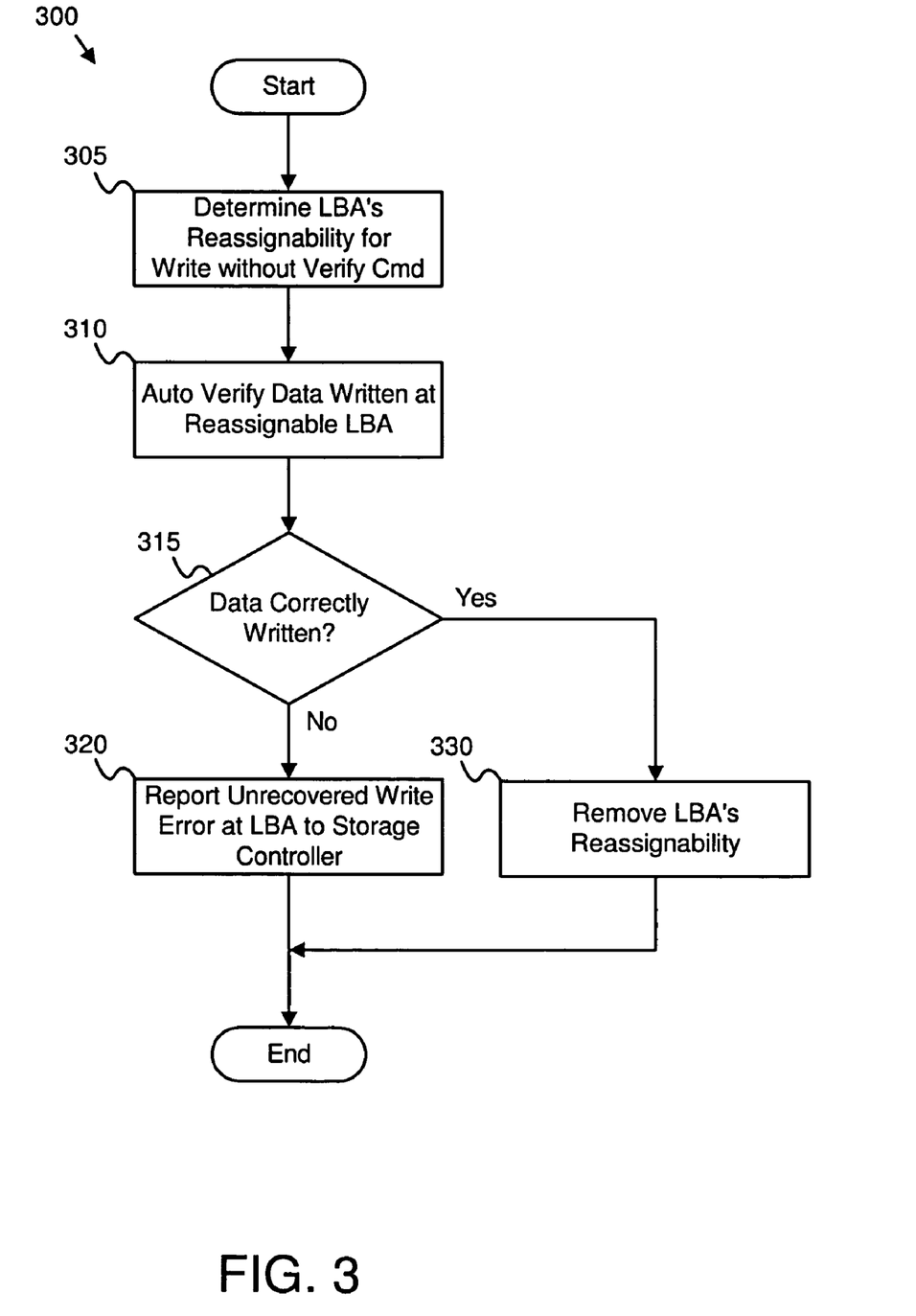
FIG. 3 is a schematic flow chart diagram illustrating one embodiment of a method for a storage device's enforcing write recovery in accordance with the present invention.

FIG. 3 is a schematic flow chart diagram illustrating one embodiment of a method 300 for a storage device's enforcing write recovery in accordance with the present invention. The description of the enforcement method 300 refers to elements of FIGS. 1 and 2, like numbers referring to like elements. The HDD 115 has, in certain embodiments, a reassignment log 530 that lists LBAs of the defective blocks that the HDD 115 recommends the storage controller 110 to reassign. The reassignable check module 205 determines 305 the reassignability of an LBA specified by a write without verify command such as WRITE command by searching the reassignment log 530 for a match with the LBA. Once the LBA's reassignability is established, the auto verify module 210 automatically verifies 310 the data written at the reassignable LBA subsequent to a successful completion of the write operation on said write command.

In one embodiment, the auto verify module 210 patterns after the verify portion of a WRITE AND VERIFY command with an ECC check on the data, without providing a byte check option. In an alternate embodiment, the auto verify module 210 simulates the operation of a READ command with the FUA bit being set to 1 without transferring any data to the storage controller 110 to validate the data. The auto verify module 210 determines 315 if such data is correctly written. If the data is correctly written, the reassignment log 530 removes 330 the LBA from its list of defective LBAs, bypassing any error posting.

If the data is not correctly written, the error posting module 215 reports 320 an Unrecovered Write Error, with a recommendation of block reassignment for the LBA in a preferred embodiment, to the storage controller 110. In response to the error report, the storage controller 110 may initiate a write recovery procedure 400 (FIG. 4) including a possible reassignment and a subsequent re-write for the LBA as will be described hereafter. The enforcement method 300 accomplishes the HDD's 115 enforcement of a recommended reassignment for the reaffirmed defective block at the next write opportunity.

Figure 4:
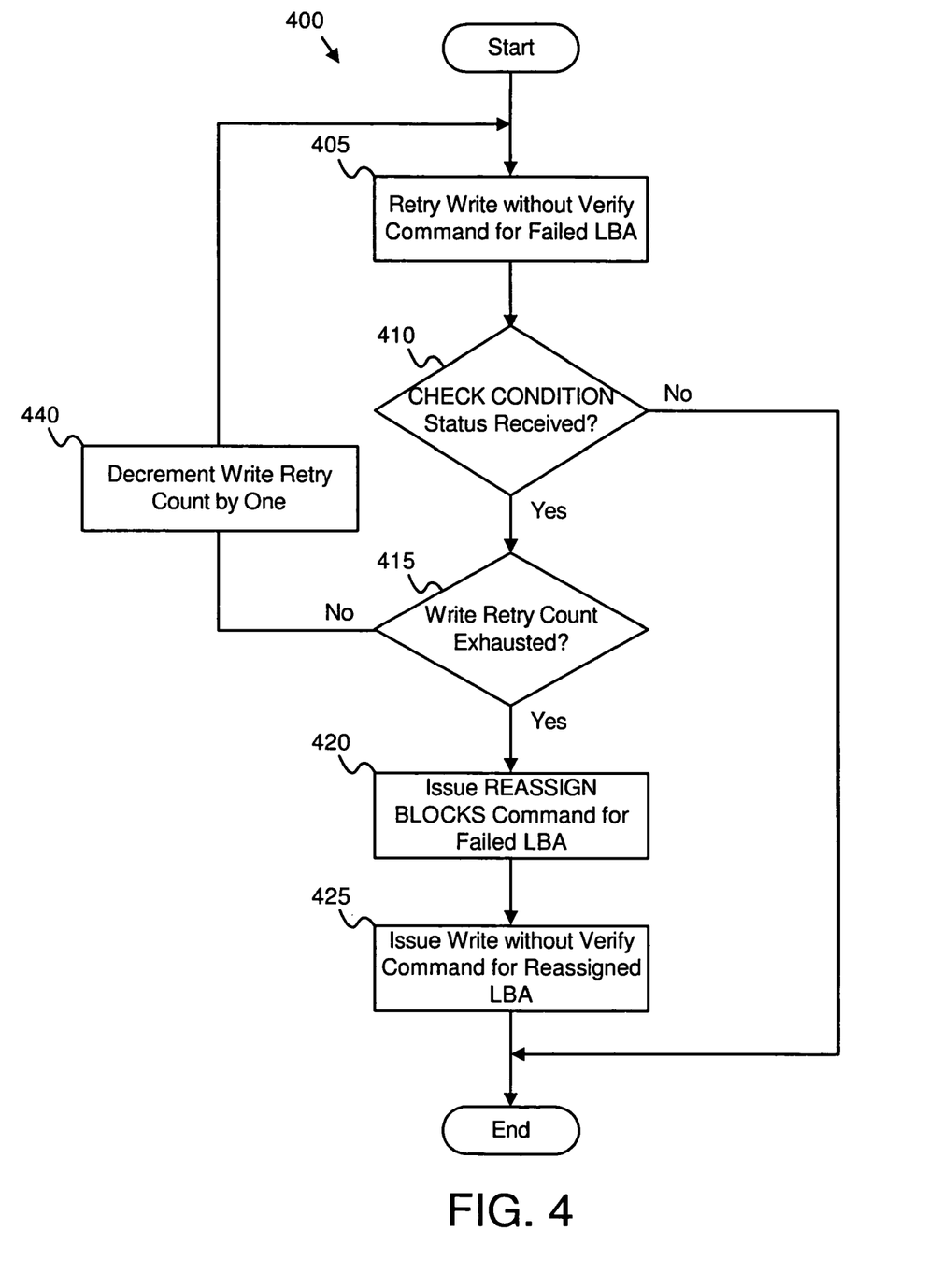
FIG. 4 is a schematic flow chart diagram illustrating one embodiment of an enforced write recovery procedure performed by the storage controller in accordance with the present invention.

FIG. 4 is a schematic flow chart diagram illustrating one embodiment of an enforced write recovery procedure 400 performed by the storage controller 110 in accordance with the present invention. The description of the write recovery procedure 400 refers to elements of FIGS. 1-3, like numbers referring to like elements. In one embodiment, upon the receipt of the HDD's 115 report 320 of an Unrecovered Write Error, the storage controller 110 starts a write recovery procedure 400. In one embodiment, the storage controller 110 retries 405 the write without verify command for the failed LBA. Since the failed LBA is determined reassignable by the reassignable check module 205, the auto verify module 210 is activated to verify the data written following a successful completion of the write portion during each write retry.

At the conclusion of said write command, the storage controller 110 determines 410 if the status received from the HDD 115 is CHECK CONDITION. If the status is a GOOD status, not a CHECK CONDITION status, the write recovery procedure 400 by the storage controller is terminated. The HDD 115 will cause the reassignment log 530 to remove the LBA (not shown). If the status is a CHECK CONDITION status, as the auto verify operation performed by the auto verify module 210 during the write retry may continue to be unsuccessful, the storage controller 110 determines 415 if the pre-defined write retry count is exhausted. If not, the storage controller 110 decrements 440 the write retry count by one ("1") and proceeds to again retry 405 the write without verify command for the failed LBA. The process described so far repeats.

If the status is a CHECK CONDITION status and the write retry count is exhausted, the storage controller 110 issues 420 a REASSIGN BLOCKS command for the failed LBA. Subsequent to the completion of the REASSIGN BLOCKS command, the auto verify operation by the auto verify module 210 is no longer activated for the reassigned LBA, and the HDD 115 removes the LBA from the reassignment log (not shown). In one embodiment, the storage controller 110 then issues 425 the write without verify command for the reassigned LBA. Following the successful completion of the write at the reassigned location, in one embodiment, the storage controller 110 issues a READ command with the FUA flag bit set to 1 to the HDD 115 to explicitly verify that the data is correctly written (not shown). The storage controller's 110 write recovery procedure 400 started in response to the error posting module's 215 report of an Unrecovered Write Error progresses to experience repeated auto verify failure at the reassignable LBA during write retries, leading to a reassignment for the failed LBA and a re-write of the data at the reassigned location by the storage controller 110, as recommended by the HDD 115 all along.

FIG. 5 is a schematic block diagram illustrating one embodiment of LBA information 500 involved in a storage device enforced write recovery in accordance with the present invention. The description of the LBA information 500 refers to elements of FIGS. 1-4, like numbers referring to like elements. In the depicted embodiments, beginning in time period t1, the HDD 115 performs a write operation in response to the storage controller 110 issued WRITE command for data creation, specifying four consecutive data blocks 510 to be written from LBA=L. As such, the LBAs specified by this command for the four data blocks 510 are L, L+1, L+2, and L+3, respectively. Internal physical addresses 505 in terms of cylinder-head-sector ("CHS") numbers assigned to these LBAs are 1-0-0, 1-0-1, 1-0-2, and 1-0-3, respectively.

The flag bits 520 included in the read-write recovery mode page 515 for parameters AWRE, ARRE, PER, and RC are all set to 0, meaning that the HDD 115 is not allowed to automatically reallocate a defective block during a write or read operation, nor is it allowed to report recovered errors. As illustrated, the HDD's 115 reassignment log 530 consisting of a table of m entries and a valid flag bit column 535 and an LBA column 540 representing defective blocks needing reassignments by the storage controller 110 remains to have no valid entries as a result of the successful write operation (assuming that there were no valid entries therein to begin with).

In a later time period t2, the HDD 115 is shown to read four consecutive data blocks 510 from LBA=L based on a READ command issued by the storage controller 110 for data retrieval. As a result of this operation, the HDD 115 detects a read error at LBA=L+1 in unreportable marginally recovered data (case 1) or unrecovered data (case 2). In case 1, all four data blocks 510 are transferred to the storage controller 110, whereas in case 2 the operation is terminated at the end of reading data at LBA=L+1. In either case, the HDD 115 enters L+1 into the LBA column 540 of the reassignment log 530 at entry number 0, indicating that LBA=L+1 needs to be reassigned by the storage controller 110.

Subsequently, in time period t3, the HDD 115 is depicted as performing a write operation on two data blocks 510 at LBA=L and LBA=L+1 for a WRITE command from the storage controller 110 for data updating. Because the reassignable check module 205 (not shown) finds LBA=L+1 listed in the reassignment log 530, the auto verify module 210 (not shown) is invoked to automatically verify data written at LBA=L+1 after the write is completed successfully. In the depicted embodiment, the auto verify fails to verify that data at LBA=L+1 is correctly written. The error posting module 215 (not shown) reports an Unrecovered Write Error to the storage controller 110. This error indication causes the storage controller 110 to start a write recovery procedure leading to a block reassignment of LBA=L+1 to CHS=x-y-z, as shown, from original 1-0-1, and a re-write of block L+1 at the reassigned location followed by a successful explicit verify operation. After the reassignment is made, the reassignment log 530 is shown to have the valid flag bit 535 at entry number 0 set to 0, removing LBA=L+1 from the table. Details of commands executed and their individual results in data creation, retrieval, and updating described above are summarized in FIG. 6.

Figure 6:
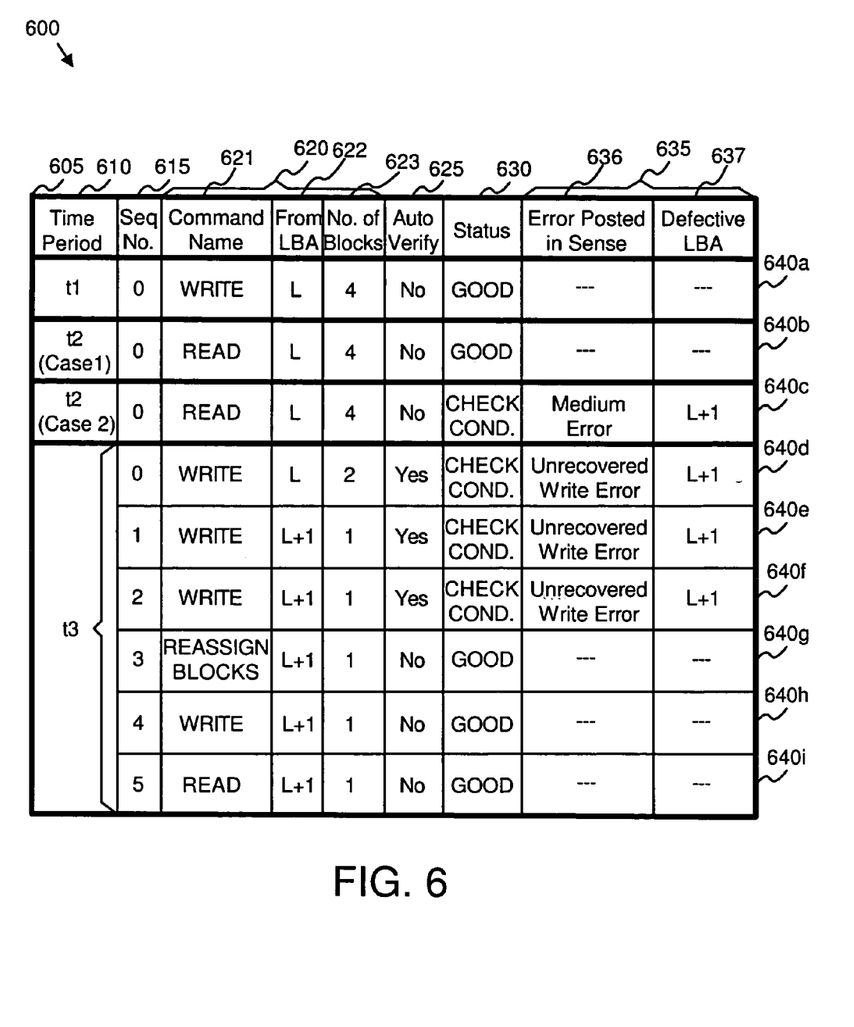
FIG. 6 is a schematic block diagram illustrating one embodiment of a command history of a storage device enforced write recovery in accordance with the present invention.

FIG. 6 is a schematic block diagram illustrating one embodiment of a command history 600 of a storage device enforced write recovery in accordance with the present invention. The description of the command history 600 refers to elements of FIGS. 1-5, like numbers referring to like elements. For illustration purposes, a command history table 605 is included to list the commands executed by the HDD 115 for data creation, data retrieval, and data updating operations depicted in FIG. 5 in the order of occurrence of the commands, so that the command listed at the top is the least recently received command, and that the command at the bottom is the most recently received command. The command history table 605 comprises a time period column 610, a sequence number column 615 that shows the order of occurrence of commands in a write recovery procedure, a partial CDB column 620, an auto verify column 625, a status column 630, and a partial sense data column 635. The partial CDB column 620 includes a command name sub-column 621, a from LBA sub-column 622, and a number of blocks sub-column 623. The partial sense data column 635 consists of an error posted in sense sub-column 636 and a defective LBA sub-column 637. In the depicted embodiments, status and sense data are made available together by the HDD 115, without requiring a separate REQUEST SENSE command in the case of a CHECK CONDITION status.

Each row of the command history table 605 contains an execution summary 640 for the command included therein. Execution summary 640 of each command for the exemplary data creation, retrieval, and update operations illustrated in FIG. 5 may be described below including error information internally available to the HDD 115 only.

Execution Summary

| 640 for Each Cmd | Description |
| --- | --- |
| 640a | In period t1 a WRITE command 621 is executed for data creation from LBA = L 622 for four (4) 623 data blocks 510 successfully with a GOOD status 630. Auto verify 625 is not activated. The reassignment log 530 remains unchanged: zero valid entries. |
| 640b | Case 1: In period t2 a READ command 621 is executed for data retrieval from LBA = L 622 for four (4) 623 data blocks 510, encountering a marginally recovered read error in block L + 1, but a GOOD status 630 is presented because of the disability for reporting recovered errors. The reassignment log 530 enters L + 1 in LBA column 540 at entry 0 and sets the valid flag bit 535 to 1 therein. Auto verify 625 is not activated during a read. Note that if the PER flag bit 520 was set to 1 instead, the read error would be reported, and a CHECK CONDITION status would be returned. The sense data would indicate the error with such codes as listed in Table 1 and the defective block LBA = L + 1. The storage controller 110 would have an opportunity to perform a write recovery during this read. If failing to do it then, the storage controller 110 would be able to do it at the next write opportunity according to this invention. |
| 640c | Case 2: In period t2 a READ command 621 is executed for data retrieval from LBA = L 622 for four (4) 623 data blocks 510, encountering an unrecovered read error at LBA = L + 1 637 that terminates the command. A CHECK CONDITION status 630 is presented, with Sense Key indicating Medium Error 636. The reassignment log 530 enters L + 1 in LBA column 540 at entry 0 and sets the valid flag bit 535 to 1 therein. Auto verify 625 is not activated during a read. |
| 640d | In time period t3 a WRITE command 621 is executed for data update from LBA = L 622 for two (2) 623 data blocks 510. During the execution, the reassignable check module 205 finds LBA = L + 1 in the reassignment log 530 and causes the auto verify module 210 to perform an auto verify 625 at LBA = L + 1 after data is written. Because the data at LBA = L + 1 is found incorrectly written by the auto verify module 210, the error posting module 215 posts an Unrecovered Write Error 636 at defective block L + 1 637 in sense data 635 and causes a CHECK CONDITION status 630 to be presented to the storage controller 110 along with the sense data 635. |
| 640e | Still in period t3 for a write recovery procedure, a first retry WRITE command 621 for one (1) 623 data block 510 from LBA = L + 1 622 is executed. Again, an auto verify 625 fails to verify that data is correctly written at LBA = L + 1. A CHECK CONDITION status 630 is presented to the storage controller 110 along with the sense data 635 indicating an Unrecovered Write Error 636 and the defective LBA = L + 1 637. (The write retry count is assumed to be two in this example.) |
| 640f | Continuing with the write recovery, a second retry WRITE command 621 for the same block LBA = L + 1 622 is executed, with the auto verify 625 being performed at LBA = L + 1, and it ends up with the same result as in the first retry WRITE. Now the write retry count is exhausted. |
| 640g | In continuation of the write recovery procedure, a REASSIGN BLOCKS command 621 is executed for LBA = L + 1 622 successfully, leading to a GOOD status 630. The auto verify module 210 is not activated for the LBA any longer. The reassignment log 530 removes the entry (entry 0) that has LBA = L + 1 by setting the corresponding valid flag bit 535 to 0. |
| 640h | Still within period t3, a WRITE command 621 for data block 510 at LBA = L + 1 622 is executed successfully at the reassigned location, and a GOOD status 630 is presented. No auto verify 625 takes place for this write. |
| 640i | As the last activity in period t3, a READ command 621 with the FUA bit being set to 1 for the data block 510 at LBA = L + 1 622 is executed successfully, effectively verifying that the data block 510 at LBA = L + 1 is correctly written, and a GOOD status 630 is returned. This concludes the storage controller's 110 write recovery procedure consisting of five (5) commands 621 with sequence numbers 1, 2, 3, 4, and 5 615. |

The present invention provides a storage device with the ability to re-discover and report the defect to the storage controller, leading to relocating the defective data block to a defect-free spare sector by the storage controller. This enforced write recovery action on erroneous data also avoids subsequent futile re-read attempts, thereby improving data access performance. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for a storage device's enforcing write recovery of erroneous data, the apparatus comprising:
   a reassignable check module configured to determine whether the logical block address ("LBA") of a data block specified by a write without verify command is included in the storage device's reassignment log, the reassignment log comprising a list of LBAs of defective data blocks to be reassigned by a storage controller and configured to remove the LBA of a defective data block from the list subsequent to finding said data block no longer deemed defective, the defective data blocks comprising data blocks that were found to have unrecovered read errors, and reported and unreported marginally recovered read errors deemed likely to lead to unreadability of the contained data by the storage device;
   an auto verify module configured to automatically verify that data is correctly written at the LBA on said write command if the LBA is listed in said reassignment log; and
   an error posting module configured to report to the storage controller in response to the LBA's failing the auto verify an unrecovered write error, whereby a recovery procedure for a write error by the storage controller is triggered.

2. The apparatus of claim 1, wherein the storage device activates an auto verify operation following the successful completion of a write operation during said write error recovery procedure unless a reassignment for said LBA is made.

3. The apparatus of claim 1, wherein the auto verify module performs medium verification without data comparison, whereby a misdiagnosis of the storage device is avoided.

4. The apparatus of claim 1, wherein said storage device's enforcing write recovery of erroneous data is enabled and disabled by a storage device user.

5. The apparatus of claim 1, wherein the storage device has the option of treating said reported write error as other than write error for statistical logging purposes.

6. A system for a storage device's enforcing write recovery of erroneous data, the system comprising:
   at least one host computer;
   at least one storage controller, without memory for maintaining a data error table, selected from a group consisting of a redundant array of independent disks (RAID) controller and a non-RAID controller, and coupled to the host computer;
   a storage device, coupled to the storage controller, the storage device comprising:
   an interface module;
   a head disk assembly
   a processor;
   a memory;
   a positioning control module;
   a read-write data handler module;
   a reassignable check module configured to determine whether the LBA of a data block specified by a write without verify command is included in the storage device's reassignment log, the reassignment log comprising a list of LBAs of defective data blocks to be reassigned by the storage controller and configured to remove the LBA of a defective data block from the list subsequent to finding said data block no longer deemed defective, the defective data blocks comprising data blocks that were found to have unrecovered read errors, and reported and unreported marginally recovered read errors deemed likely to lead to unreadability of the contained data by the storage device;
   an auto verify module configured to automatically verify that data is correctly written at the LBA on said write command if the LBA is listed in said reassignment log; and
   an error posting module configured to report to the storage controller in response to the LBA's failing the auto verify an unrecovered write error, whereby a recovery procedure for a write error by the storage controller is triggered.

7. The system of claim 6, wherein the storage device activates an auto verify operation following the successful completion of a write operation during said write error recover procedure unless a reassignment for said LBA is made.

8. The system of claim 6, wherein the auto verify module performs medium verification without data comparison, whereby a misdiagnosis of the storage device is avoided.

9. The system of claim 6, wherein said storage device's enforcing write recovery of erroneous data is enabled and disabled by a storage device user.

10. The system of claim 6, wherein the storage device interface module provides a storage controller coupling interface the type of which is selected from the group consisting of Small Computer System Interface ("SCSI") Parallel Interface ("SPI"), Serial Attached SCSI ("SAS"), Fibre Channel ("FC"), Fibre Channel-Arbitrated Loop ("FC-AL"), Advanced Technology ("AT") Attachment ("ATA"), Serial ATA ("SATA"), Universal Serial Bus ("USB"), IEEE 1394, and variants and enhancements thereof.

11. The system of claim 6, wherein if the storage device is replaced with another storage device, said enforced write recovery of all erroneous data previously found by the replaced storage device is discontinued.

12. The system of claim 6, wherein the storage device coupled to a plurality of storage controllers in a multiple-storage controller system enforces said write recovery of erroneous data on each said storage controller.

13. The system of claim 6, if the storage controller coupled to the storage device is replaced by another storage controller, the storage device continues to enforce said write recovery of erroneous data on the new storage controller.

14. A program of executable code stored on a semiconductor device and executed by a processor to perform operations to allow a storage device to enforce write recovery of erroneous data, the operations comprising:
   determining reassignability of the LBA of a data block specified by a write without verify command based on contents of the storage device's reassignment log, the reassignment log comprising a list of LBAs of defective data blocks to be reassigned by a storage controller and configured to remove the LBA of a defective data block from the list subsequent to finding said data block no longer deemed defective, the defective data blocks comprising data blocks that were found to have unrecovered read errors, and reported and unreported marginally recovered read errors deemed likely to lead to unreadability of the contained data by the storage device;
   auto verifying that data is correctly written at the LBA on said write command if the LBA is listed in said reassignment log;
   reporting to the storage controller in response to the LBA's failing the auto verify an unrecovered write error, whereby a recovery procedure for a write error by the storage controller is triggered; and executing each command called for by said write error recovery procedure.

15. The program of claim 14, further comprising operations to skip auto verify on any data block whose LBA is not listed in said reassignment log if said write command specifies multiple data blocks including said data block.

16. The program of claim 14, further comprising operations for the storage device to activate an auto verify following the successful completion of a write operation during said write error recovery procedure unless a reassignment for said LBA is made.

17. The program of claim 14, further comprising operations to perform medium verification without data comparison, whereby a misdiagnosis of the storage device is avoided.

18. The program of claim 14, further comprising operations to enable and disable said storage device's enforcing write recovery of erroneous data according to the enable/disable setting selected by a storage device user.

19. A method for a storage device's enforcing write recovery of erroneous data, the method comprising:
   determining reassignability of the LBA of a data block specified by a write without verify command based on contents of the storage device's reassignment log, the reassignment log comprising a list of LBAs of defective data blocks to be reassigned by a storage controller and configured to remove the LBA of a defective data block from the list subsequent to finding said data block no longer deemed defective, the defective data blocks comprising data blocks that were found to have unrecovered read errors, and reported and unreported marginally recovered read errors deemed likely to lead to unreadability of the contained data by the storage device;
   auto verifying that data is correctly written at the LBA on said write command if the LBA is listed in said reassignment log;
   reporting to the storage controller in response to the LBA's failing the auto verify an unrecovered write error, whereby a recovery procedure for a write error by the storage controller is triggered;
   executing each command called for by said write error recovery procedure; and
   activating an auto verify operation following the successful completion of a write operation during said write error recovery procedure unless a reassignment for said LBA is made.

20. The method of claim 19, further comprising skipping the auto verify operation on any data block whose LBA is not listed in said reassignment log if said write command specifies multiple data blocks including said data block.

21. The method of claim 19, further comprising enabling and disabling said storage device's enforcing write recovery of erroneous data according to the enable/disable setting selected by a storage device user.

22. An apparatus for enforcing a storage device's write recovery of erroneous data, the apparatus comprising:
   means for determining reassignability of the LBA of a data block specified by a write without verify command based on contents of the storage device's reassignment log, the reassignment log comprising a list of LBAs of defective data blocks to be reassigned by a storage controller and configured to remove the LBA of a defective data block from the list subsequent to finding said data block no longer deemed defective, the defective data blocks comprising data blocks that were found to have unrecovered read errors, and reported and unreported marginally recovered read errors deemed likely to lead to unreadability of the contained data by the storage device;
   means for auto verifying that data is correctly written at the LBA on said write command if the LBA is listed in said reassignment log;
   means for reporting to the storage controller in response to the LBA's failing the auto verify an unrecovered write error, whereby a recovery procedure for a write error by the storage controller is triggered;
   means for executing each command called for by said write error recovery procedure;
   means for activating an auto verify operation following the successful completion of a write operation during said write error recovery procedure unless a reassignment for said LBA is made;
   means for skipping auto verify on any data block whose LBA is not listed in said reassignment log if said write command specifies multiple data blocks including said data block;
   means for auto verifying the medium without data comparison, whereby a misdiagnosis of the storage device is avoided; and
   means for enabling and disabling said storage device's enforcing write recovery of erroneous data according to the enable/disable setting selected by a storage device user.

* * * * *